(12) United States Patent
Ernst

(10) Patent No.: US 6,250,321 B1
(45) Date of Patent: Jun. 26, 2001

(54) AWNING APPARATUS FOR AUTOMOBILES

(76) Inventor: Douglas B. Ernst, 605 Piermont Ave., Rivervale, NJ (US) 07675

( * ) Notice: Subject to any disclaimer, the term of this patent is extended or adjusted under 35 U.S.C. 154(b) by 0 days.

(21) Appl. No.: 09/240,794

(22) Filed: Jan. 30, 1999

(51) Int. Cl.$^7$ .................................................... E04H 15/08
(52) U.S. Cl. .................................. 135/88.11; 135/88.07; 135/88.05; 160/22; 160/24; 160/73; 160/370.22; 296/163
(58) Field of Search ............................. 135/88.01, 88.05, 135/88.07, 88.11; 160/22, 24, 66, 67, 73, 370.22; 296/163

(56) References Cited

U.S. PATENT DOCUMENTS

| | | | |
|---|---|---|---|
| 1,426,793 | * | 8/1922 | Vineberg et al. . |
| 2,788,791 | * | 4/1957 | Pospisil et al. . |
| 3,923,074 | * | 12/1975 | McKee . |
| 4,020,888 | * | 5/1977 | Upton et al. . |
| 4,544,195 | * | 10/1985 | Gunn . |
| 5,170,811 | * | 12/1992 | Kirk et al. . |
| 5,365,989 | * | 11/1994 | Eger et al. . |
| 5,653,278 | * | 8/1997 | Cheng . |
| 6,056,350 | * | 5/2000 | Brutsaert . |

* cited by examiner

Primary Examiner—Robert Canfield
(74) Attorney, Agent, or Firm—Arthur I. Degenholtz

(57) ABSTRACT

An apparatus includes a housing which is mounted on the lower portion of the inside of a rear window of a vehicle. The housing extends across the width of the rear window.

A pair of support arms are pivotally mounted, one each, on the sides of the housing. During storage, the support arms are generally parallel to and are attached to the front wall of the housing by a clip. The support arms can swing outwardly to provide support for an awning which is rolled onto a roller inside the housing.

During use, when the rear window has been opened, the support arms are swung in an outward direction. The awning is which is pulled outwardly and the end of the awning is hooked onto the outer ends of the support arms. The awning, which is made of a waterproof material, includes a support member which extends between the outer ends of the support arms. When the awning is rolled back into the housing, the housing catches and collects moisture from the awning and prevents water damage to merchandise stored in the vehicle. The collected moisture is discharged through a tube which is connected to the housing.

16 Claims, 9 Drawing Sheets

US 6,250,321 B1

AWNING APPARATUS FOR AUTOMOBILES

FIELD OF THE INVENTION

The present invention relates generally to the field of apparatus for automobiles and more particularly to an awning apparatus for automobiles, which protects the back of a pickup truck, van or sports utility vehicle from sun, rain or snow.

BACKGROUND OF THE INVENTION

The prior art related to awnings for vehicles includes the following US Patents.

U.S. Pat. No. 4,198,998 to Donald D. Duffy shows a retractable awning for the side of a vehicle which has a plurality of main bracing arms and stabilizer arms. Both the main bracing arms and the stabilizer arms fold into a lead bar which can be wrapped within the awning. The lengths of the bracing arms and the stabilizer arms are adjusted to provide an adjustable angle to the awning.

U.S. Pat. No. 4,519,409 to Roger D. Kinney et al. shows an awning adapted to be attached to the bumper of an automobile in which a vertical cantilever support is clamped onto the bumper and adjustable straps are attached to the wheel wells for stability.

U.S. Pat. No. 4,544,195 to Mary M. Gunn shows a rear cover for a pickup truck having a rigid camper enclosure in which the cover extends over the rear and the sides of the rear panel and includes attachments to the side and rear edge portions of the camper enclosure. The cover includes a window opening an insect screen.

Despite the various developments in the prior art there remains a need for an awning apparatus for automobiles which can be easily attached to the rear of a sport utility vehicle and which can be easily opened to provide effective protection against inclement weather.

OBJECTS AND SUMMARY OF THE INVENTION

It is an object of the present invention to provide an awning apparatus for automobiles which can be mounted on the rear of a sport utility vehicle.

Another object of the present invention is to provide an awning apparatus for automobiles which can be easily stored when not in use.

Another object of the present invention is to provide an awning apparatus for automobiles which provides protection for a person standing at the rear of a sport utility vehicle when the rear door of the sport utility vehicle is opened.

Another object of the present invention is to provide an awning apparatus for automobiles which can be mounted completely inside a vehicle when in the storage mode.

Another object of the present invention is to provide an awning apparatus for automobiles which does not interfere with the streamline characteristics of the vehicle when the vehicle is in motion.

Yet another object of the present invention is to provide an awning apparatus for automobiles which comprises a relatively small number of component parts which can be manufactured economically in volume resulting in a relatively low overall cost.

The foregoing and other objects and advantages of the invention will appear more clearly hereinafter.

In accordance with the present invention there is provided an awning apparatus for automobiles which includes a housing which is mounted on the lower portion of the inside of a rear window of a vehicle such as a sport utility vehicle. The housing extends across the width of the rear window.

A pair of support arms are pivotally mounted, one each, on the sides of the housing. During storage, the support arms are generally parallel to and are attached to the front wall of the housing by a clip. The support arms can swing outwardly to provide support for an awning which is rolled onto a roller mounted inside the housing.

During use, when the rear window has been opened, the support arms are swung in an outward direction and are locked in place by a pair of thumb screws. The awning is pulled outwardly and the end of the awning is hooked onto the outer ends of the support arms. The awning, which is made of a waterproof material, includes a support rod which extends between the outer ends of the support arms. When the awning is rolled back into the housing, the housing catches and collect moisture from the awning and prevents water damage to merchandise stored in the vehicle. The collected moisture is discharged through a tube which is connected to the housing.

DESCRIPTION OF THE DRAWINGS

Other important objects and advantages of the invention will be apparent from the following detailed description of the invention taken in connection with the accompanying drawings in which.

DETAILED DESCRIPTION OF THE INVENTION

Figure 1:
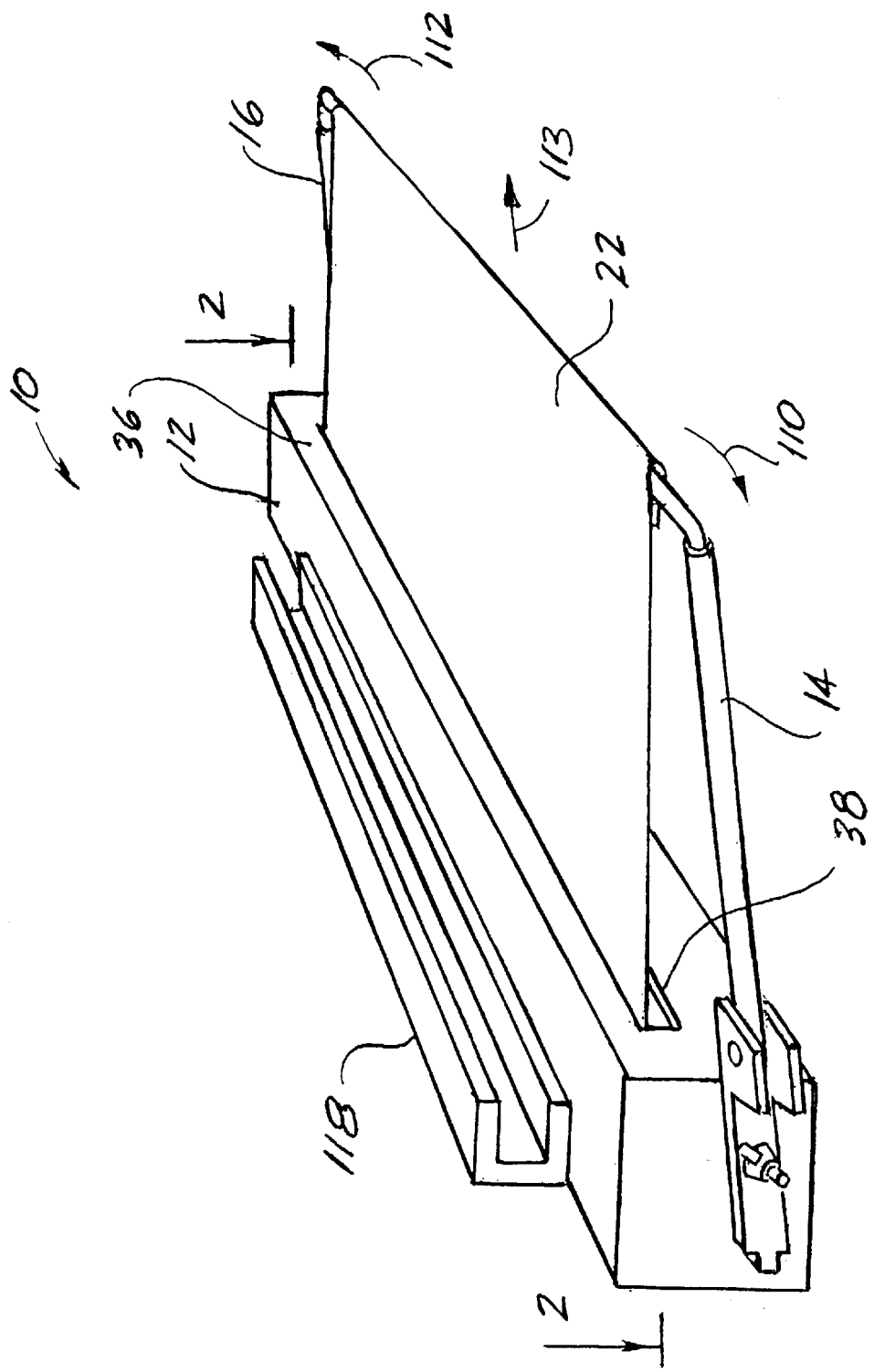
FIG. 1 is an overall perspective view of an awning apparatus for automobiles, made according to the present invention.

With reference to the drawings, in which like reference numbers designate like or corresponding parts throughout, there is shown in FIG. 1 an awning apparatus for automobiles, generally designated by reference number 10, made in accordance with the present invention, which includes a housing 12, a pair of support arms 14,16, a pair of support brackets 18,20, an awning 22 and an awning storage roller assembly 24.

The housing 12 includes a top panel 26, a bottom panel 28, side panels 30, 32, rear panel 34 and a front panel 36. A slot 38 in the front panel 36 facilitates the passage of the awning 22 into and out of the housing 12 in a manner which will be presently described. Support brackets 18,20 are mounted, one each, on the side panels 30,32. The support brackets 18,20 each include a plate 40 and a pair of support flanges 42 which are formed at the top and bottom edges of the plate 40.

The support brackets 18,20 are identical except for being of opposite hand and therefore only the support racket 18 will be described in detail. The plate 40 is pivotally mounted on side panel 30 by means of a threaded stud 48 and washers 50. The angular position of the support bracket 18 relative to the housing 12 is controlled by a thumbscrew 52 which is threaded onto the stud 48 and a tab 54 which is formed on the end 56 of the plate 40 and which projects into a hole 58 which is one of a series of holes 60 formed in the side panel 30. Tightening the thumbscrew 52 causes the plate 40 to bear against the side panel 30 thereby locking the position of the support bracket 18 relative to the housing 12.

Figure 2:
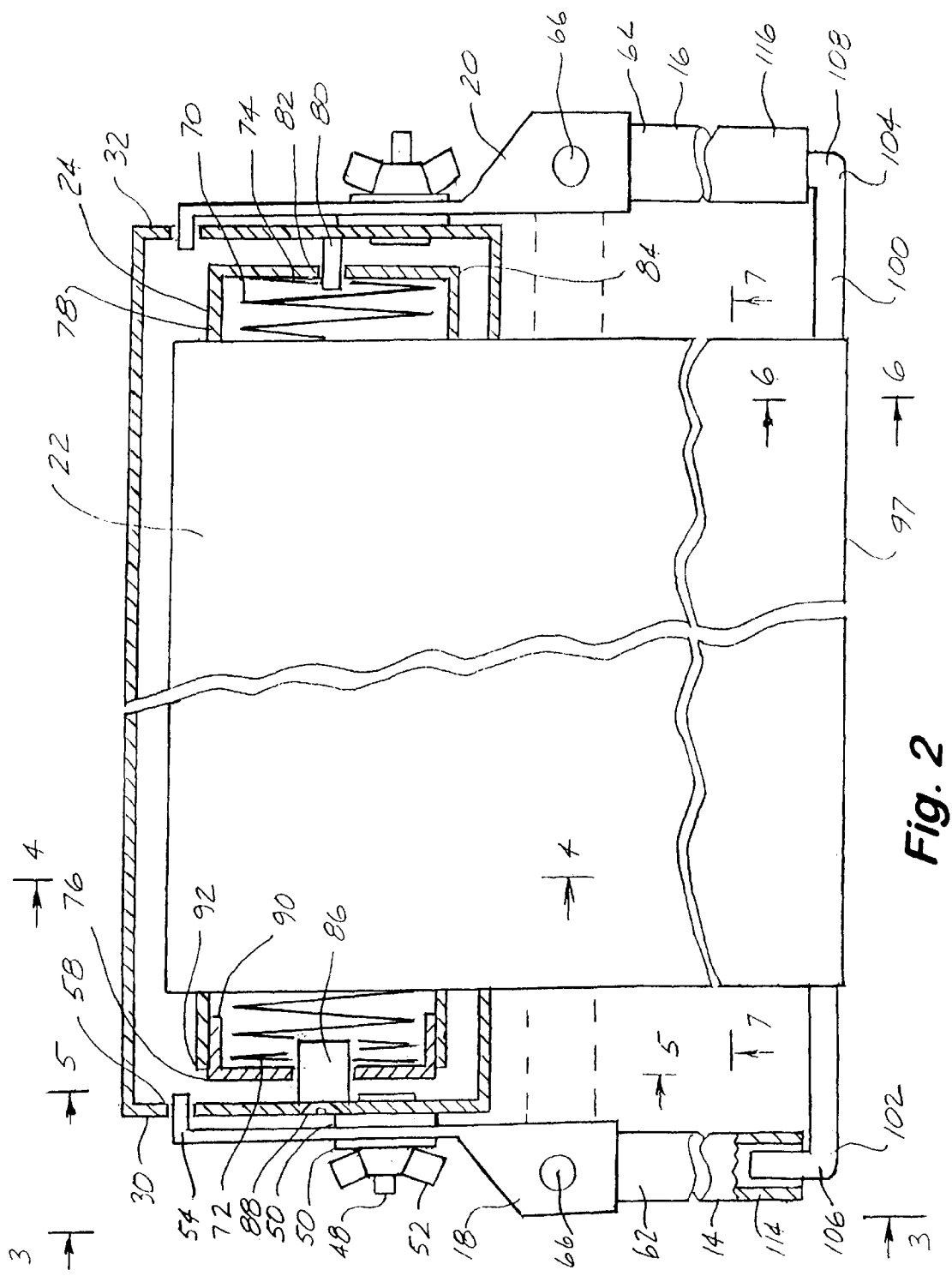
FIG. 2 is a cross-sectional view taken along the line 2—2 of FIG. 1.
Figure 3:
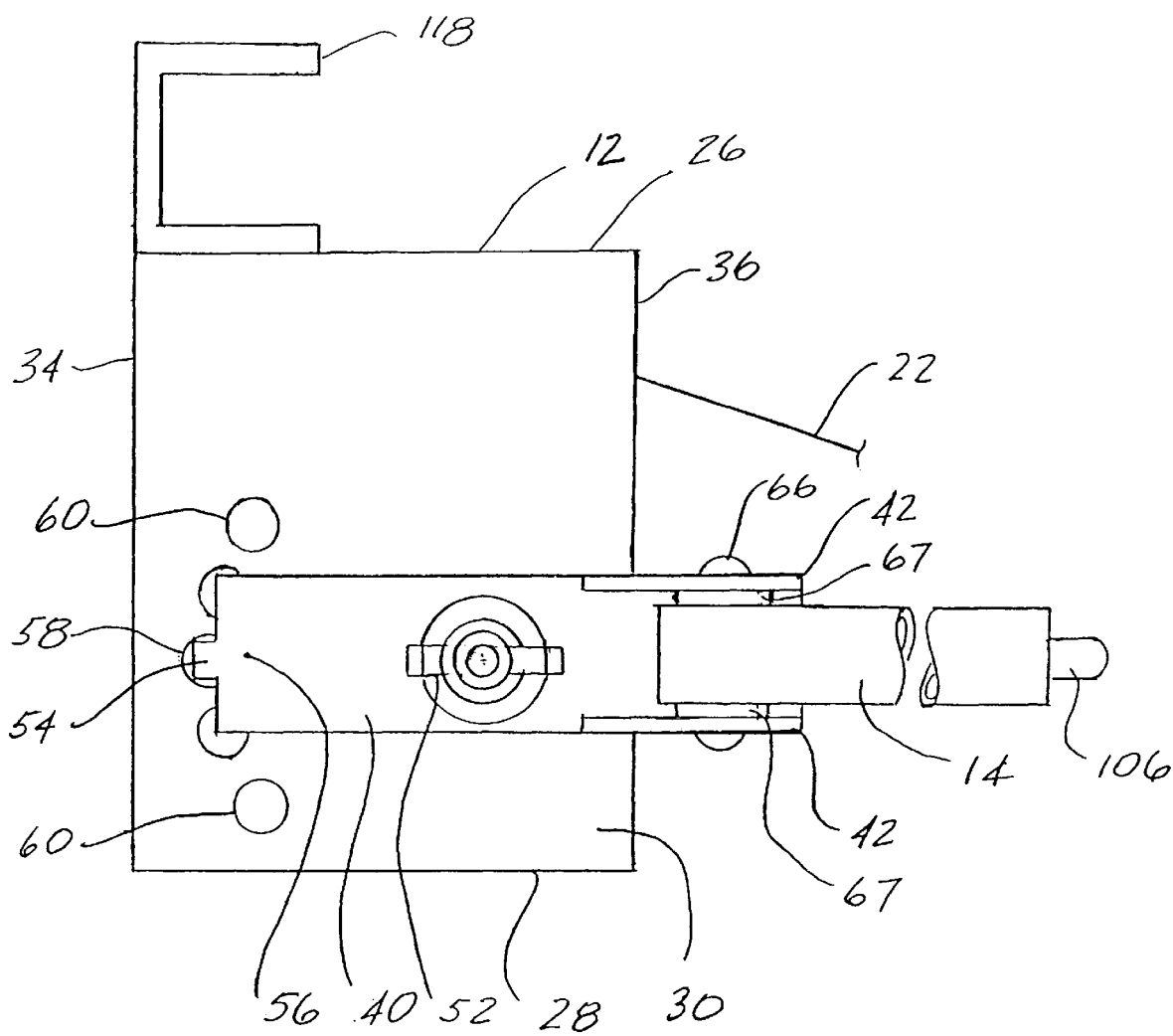
FIG. 3 is a side elevational view taken along the line 3—3 of FIG. 2
Figure 7:
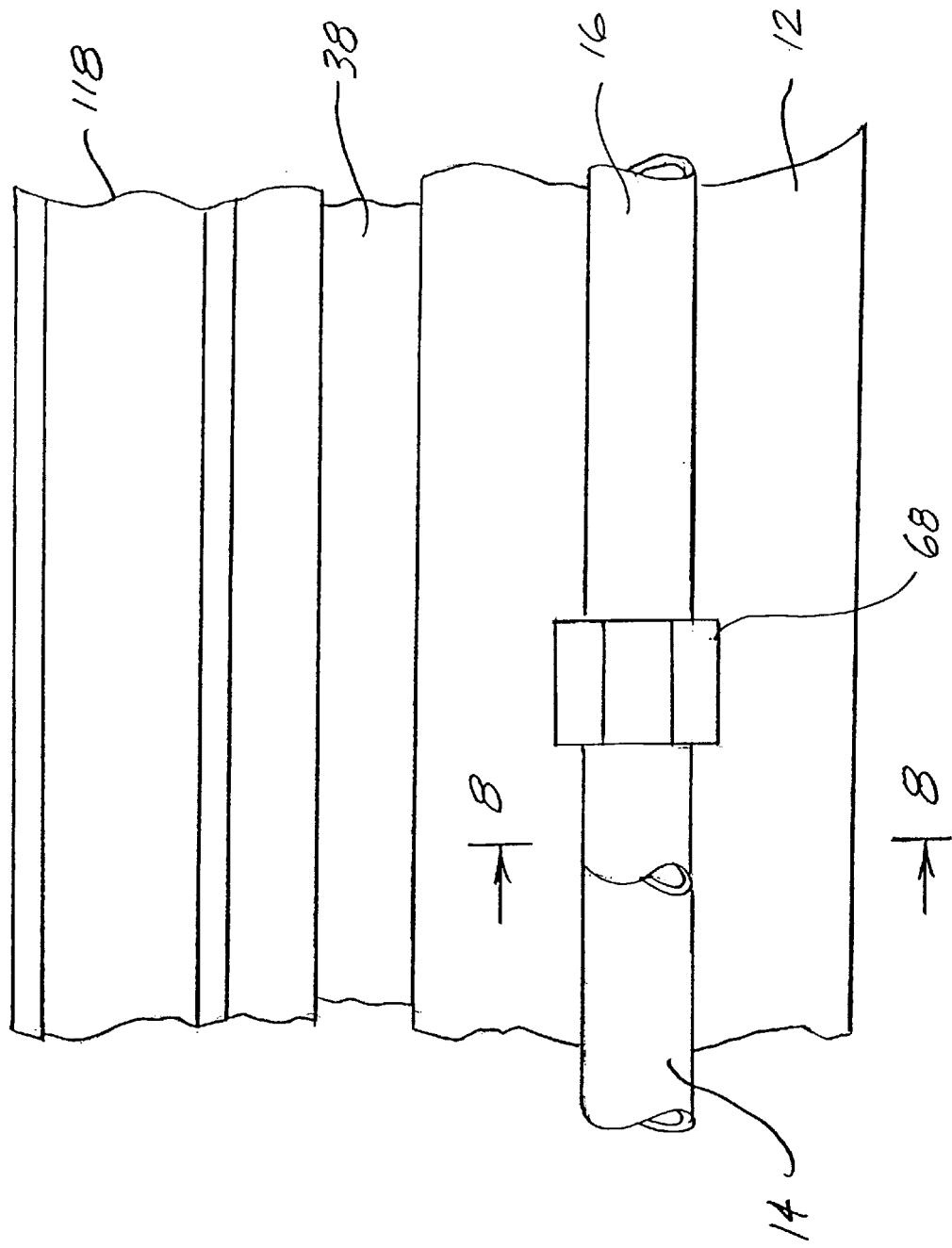
FIG. 7 fragmentary front elevational view taken along the line 7—7 of FIG. 2.
Figure 8:
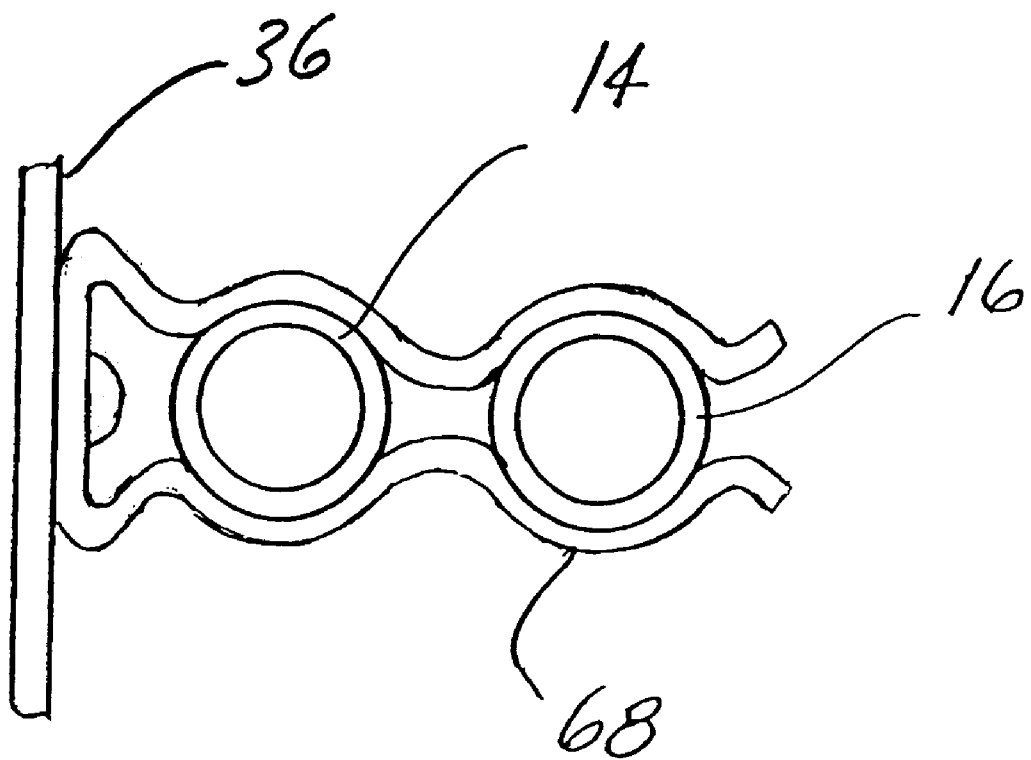
FIG. 8 is a fragmentary cross-sectional view taken along the line 8—8 of FIG. 7.

The ends 62,64 of the support arms 14,16 are pivotally mounted between the flanges 42 by means of rivet 66 and washers 67. As is best shown in FIG. 7, when the support arms 14,16 are in the closed position, the position of the support arms 14,16 relative to the housing 12 is maintained by a clip 68 which is mounted on the front panel 36 of the housing 12. The closed position of the support arms 14,16 is shown in broken lines in FIG. 2.

The awning storage roller assembly 24 includes a torsion spring 70 which has ends 72,74, a support cap 76 and a roller member 78. The roller member is rotatably mounted on a stud 80 which is mounted on the side panel 32 and which projects into a hole 82 in the end 84 of the roller member 78. The support cap 76 is mounted on a square stud 86 which is mounted on the side panel 30 by a screw 88. The support cap 76 is thus prevented from rotating. The end 90 of the support cap 76 projects into the open end 92 of the hollow roller member 78. The first end 72 of the torsion spring 70 is connected to the support cap 76 and the second end 74 of the torsion spring 70 is connected to the end 84 of the roller member 78.

Figure 4:
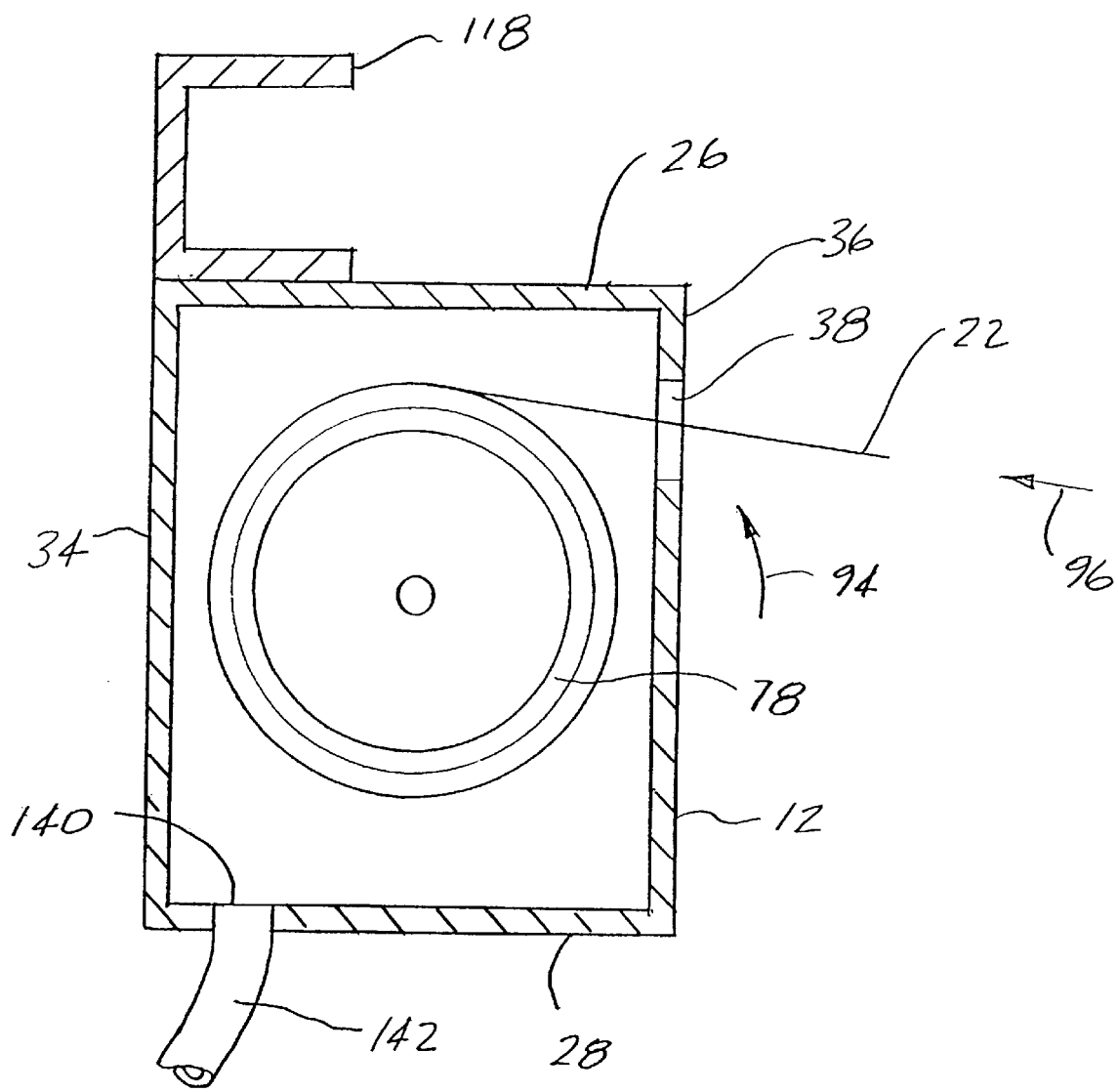
FIG. 4 is a cross-sectional view taken along the line 4—4 of FIG. 2.
Figure 5:
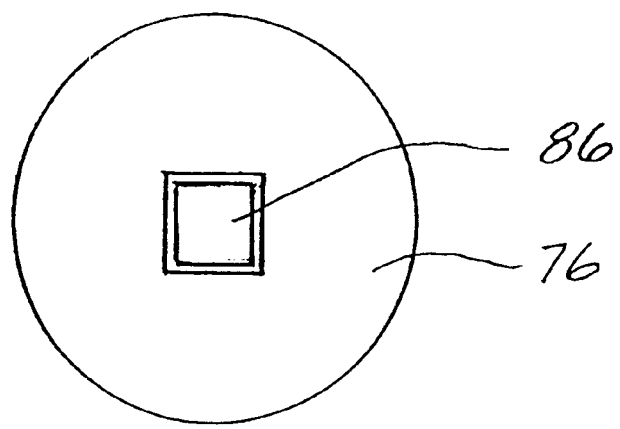
FIG. 5 is a cross-sectional view taken along the line 5—5 of FIG. 2.
Figure 6:
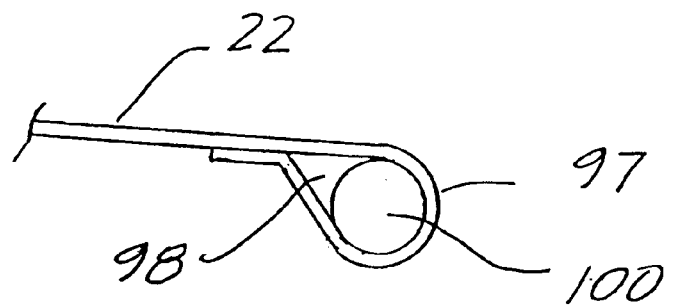
FIG. 6 is a cross-sectional view taken along the line 6—6 of FIG. 2.

When in the closed position, the awning 22 is rolled onto the roller member 78 as is best shown in FIG. 4. The torsion spring 70 which is mounted in the roller member 78 applies a torque to the roller member 78 which rotates the roller member 78 in the direction shown by the arrow 94 in FIG. 4 thereby causing the awning 22 to roll onto the roller member 78. The awning is thus continually pulled in the direction shown by the arrow 96 in FIG. 4. The awning 22 is waterproof, generally rectangular and includes an outer edge 97 which is folded and sewn, or alternatively, secured by an adhesive layer, to form a pocket 98. Support rod 100 is positioned in the pocket 98. The ends 102,104 of the support rod 100 are bent to form a pair of legs 106,108. When in the open position, the support arms 14,16 are swung outwardly in the directions shown by the arrows 110, 112 in FIG. 1 to the position shown in FIGS. 1 and 2. The support rod 100 is pulled in the direction shown by the arrow 113 and the legs 106,108 are inserted in the hollow ends 114, 116 of the support arms 14,16. The torsion spring 70 continues to pull the awning 22 inwardly in the direction shown by the arrow 96.

Figure 9:
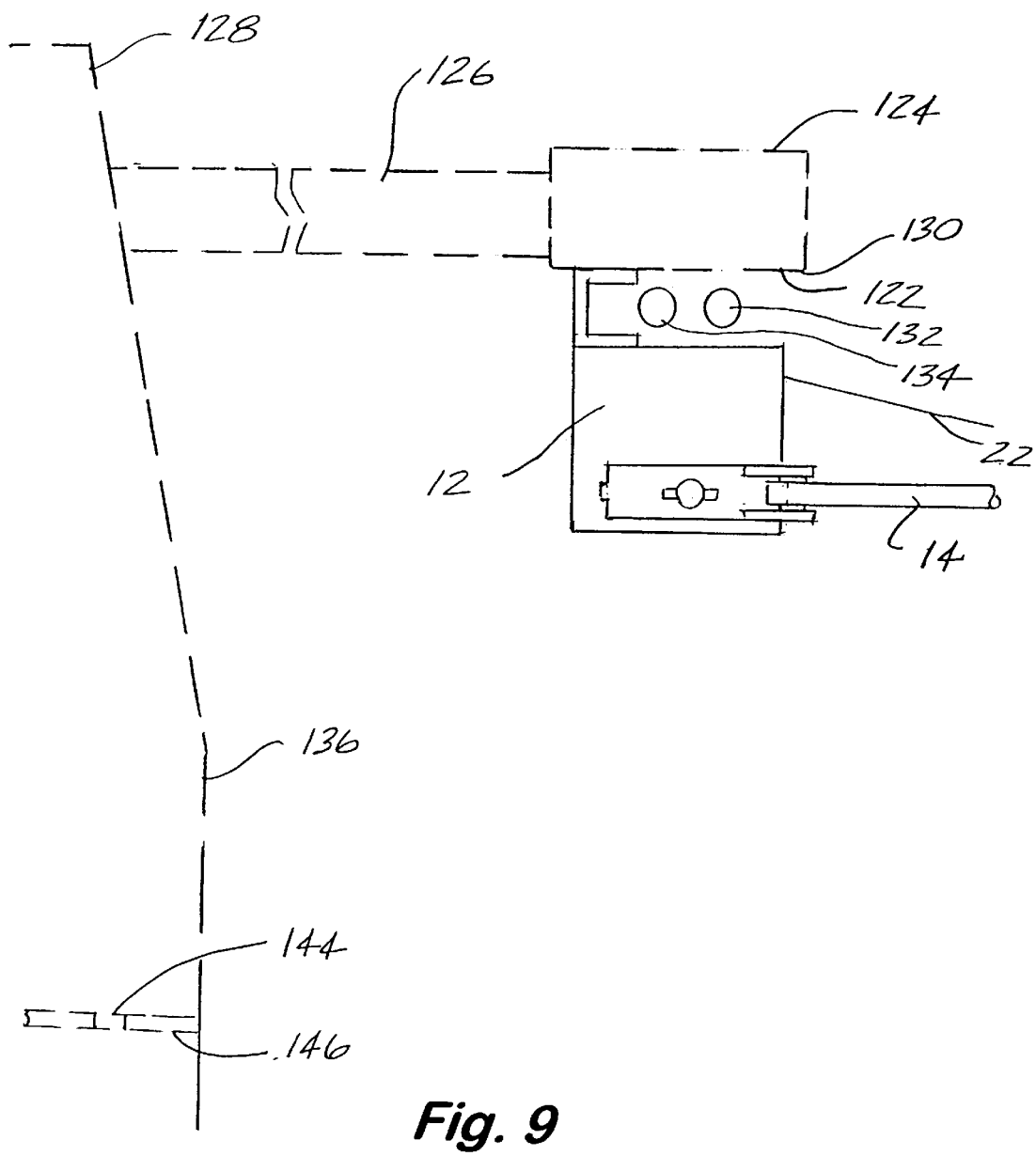
FIG. 9 is a side elevational view of the awning apparatus for automobiles of FIG. 1, showing the apparatus in use mounted on the rear window of a sport utility vehicle with the sport utility vehicle shown in broken lines.

During use, spacer 118 which is connected to the top panel 26 of the housing 12 serves to mount the housing 12 on the inside surface 122 of the frame 124 of the rear window 126 of a sport utility vehicle 128, proximate to the lower edge 130 of the window 126, as is shown in FIG. 9. The structure of the sport utility vehicle 128 has been shown, for reference, in broken lines in FIG. 9. The spacer 118 positions the housing 12 away from the window frame 124 and prevent interference between the housing 12 and the lock rods 132, 134, which lock the rear window 126 and the tailgate 136 of the sport utility vehicle 128.

The bottom panel 28 includes a drain hole 140 which leads to a flexible tube 142. The flexible tube 142 serves to conduct moisture which has collected in the housing 12 to a drain hole 144 in the floor 146 of the sport utility vehicle 128. The flexible tube 142 thus prevents damage to materials being transported in the sport utility vehicle 128 even though the inside of the housing 12 may be wet as a result of the exposure of the awning 22 to the elements.

Figure 10:
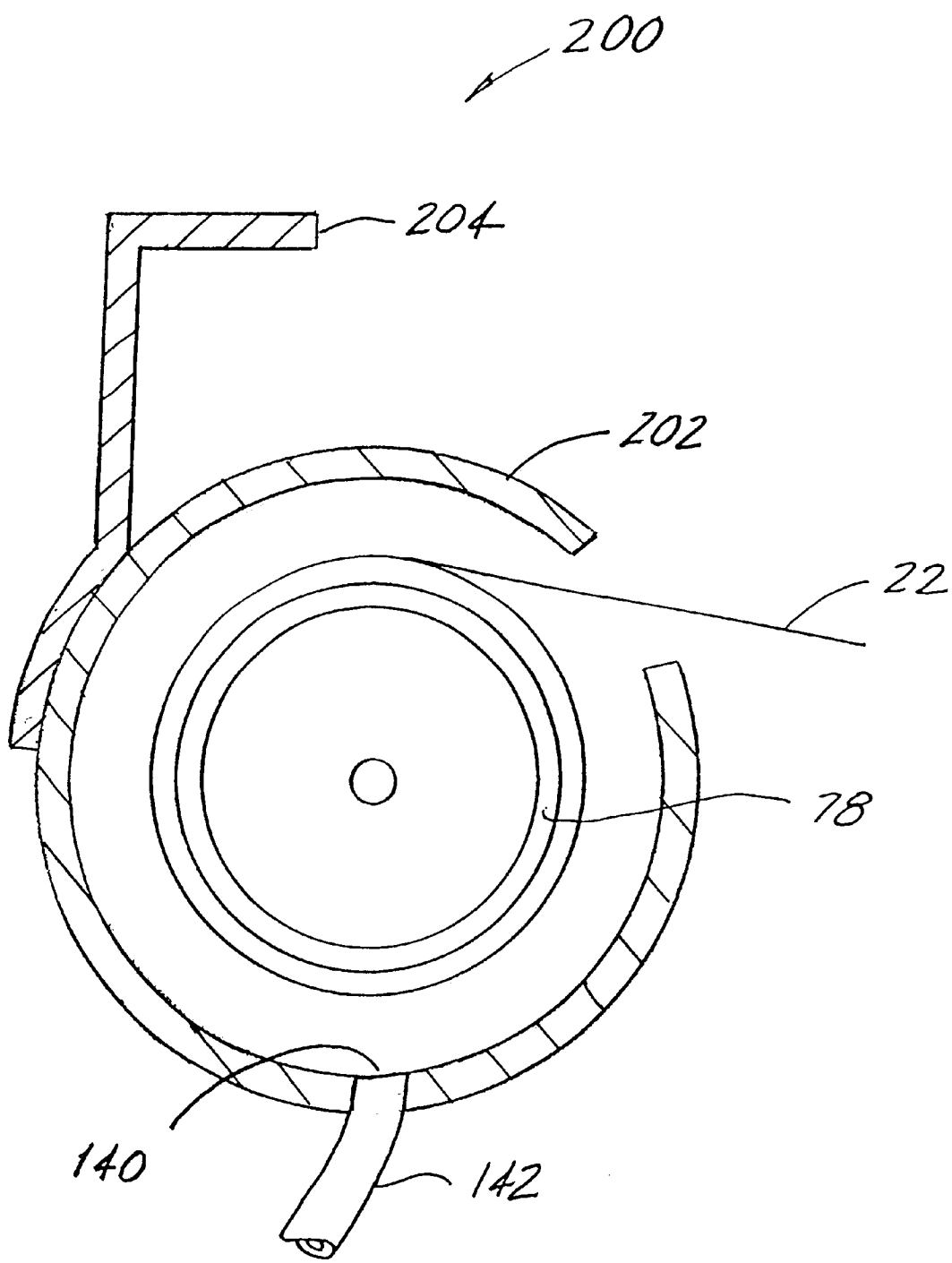
FIG. 10 is a cross-sectional view, similar to FIG. 4, showing an alternative embodiment of the invention which incorporates an alternative configuration of the housing.

FIG. 10 shows an alternative embodiment of the invention 200 in which the housing 12 is replaced by a housing 202 which is circular, or nearly circular, in cross-section and the spacer 118 is replaced by a spacer 204. The spacer 204 is used to mount the housing 202 to the inside surface 122 of the sports utility vehicle 128 in the manner which has been described in connection with FIG. 9. The operation of the embodiment 200 and all of the other components of the embodiment 200 are the same as has been previously described.

The foregoing specific embodiment of the present invention as set forth in the specification herein is for illustrative purposes only. Various deviations and modifications may be made within the spirit and scope of this invention without departing from the main theme thereof.

What is claimed is:

1. An awning apparatus for automobiles comprising:
    a housing;
    mounting means for attachment of said housing to an automobile;
    a pair of support arms;
    attachment means for attachment of said support arms to said housing; with said support arms capable of a first position generally parallel to said housing and a second position generally perpendicular to said housing;
    awning means;
    awning roller means with said awning roller means mounted in said housing; with said awning means capable of a first position in which said awning means is stored rolled on said awning roller means and a second position in which said support arms are in said second position and said awning means is supported by said support arms with said attachment means further comprising:
    locking means for adjustably locking said support arms in said second position.

2. An awning apparatus for automobiles according to claim 1 in which:
    said awning roller means comprises hollow roller means.

3. An awning apparatus for automobiles according to claim 1 further comprising:
    spring means mounted in said hollow roller means for rolling said awning means onto said hollow roller means.

4. An awning apparatus for automobiles according to claim 1 in which said awning means comprises:
    a flexible, generally rectangular, waterproof member having a first relatively shorter edge, a second relatively shorter edge, a first relatively longer edge and a second longer edge.

5. An awning apparatus for automobiles according to claim 4 in which said first relatively shorter edge of said awning means is attached to said roller means.

6. An awning apparatus for automobiles according to claim 4 further comprising:

support rod means attached to said second relatively shorter edge of said awning means.

7. An awning apparatus for automobiles according to claim 1 in which said attachment means comprises:

pivotal attachment means.

8. An awning apparatus for automobiles according to claim 1 further comprising:

drain means for draining moisture collected in said housing.

9. An awning apparatus for automobiles according to claim 1 further comprising:

locking means for locking said support arms in said first position.

10. An awning apparatus for automobiles according to claim 1 including locking means for locking said support arms in said first position comprising:

means mounted on said housing.

11. An awning apparatus for automobiles according to claim 1 which said locking means for locking said support arms in said second position comprises thumbscrew means.

12. An awning apparatus for automobiles according to claim 1 which said mounting means for attachment of said housing comprises:

spacer means mounted on said housing.

13. An awning apparatus for automobiles according to claim 1 further comprising:

adjustment means for adjustment of the angle formed by said support arms relative to a horizontal plane.

14. An awning apparatus for automobiles according to claim 1 in which said housing has a generally rectangular cross-section.

15. An awning apparatus for automobiles according to claim 1 in which said housing has a generally rectangular cross-section.

16. An awning apparatus for automobiles according to claim 1 in which said housing has a nearly circular cross-section.

* * * * *